United States Patent [19]

Jacob

[11] Patent Number: 4,574,432
[45] Date of Patent: Mar. 11, 1986

[54] MULTI-PURPOSE POWER TOOL

[76] Inventor: Lionel C. Jacob, 3805 Warren Ct., Mobile, Ala. 36608

[21] Appl. No.: 565,695

[22] Filed: Dec. 27, 1983

[51] Int. Cl.⁴ .................. A22B 5/08; A22C 21/02; A22C 25/02
[52] U.S. Cl. ........................................ 17/67; 17/69; 17/11.1 R
[58] Field of Search ................... 17/67, 69, 18, 11.1; 30/272 A, 272 R

[56] References Cited

U.S. PATENT DOCUMENTS

| | | | |
|---|---|---|---|
| 1,898,956 | 2/1933 | Harvie | 30/272 |
| 2,154,420 | 4/1939 | Crapo | 17/11.1 |
| 2,655,689 | 10/1953 | Witte | 17/67 |
| 2,753,590 | 7/1956 | McKendree | 30/272 |
| 3,203,095 | 8/1965 | Nelson | 30/272 A |
| 3,328,834 | 7/1967 | Pulcifer | 17/67 |
| 3,533,600 | 10/1970 | Gerson | 30/272 |
| 3,555,678 | 1/1971 | Agulnick et al. | 17/11.1 |
| 3,604,114 | 9/1971 | Swanke | 30/272 A |

Primary Examiner—Willie G. Abercrombie
Attorney, Agent, or Firm—Ziems, Walter & Shannon

[57] ABSTRACT

A multi-purpose power tool well suited for use by sportsmen for dressing game, such as fish and/or fowl, includes a hand-held drive unit having both a reciprocable output coupling and a rotary shaft output coupling to which reciprocately driven cutting or sawing blades may be selectively attached or to which rotatively driven fish descaling or defeathering implements may be attached. In accordance when one of the features of the present invention, the defeathering accessory is mounted over and driven by the fish descaling accessory.

5 Claims, 9 Drawing Figures

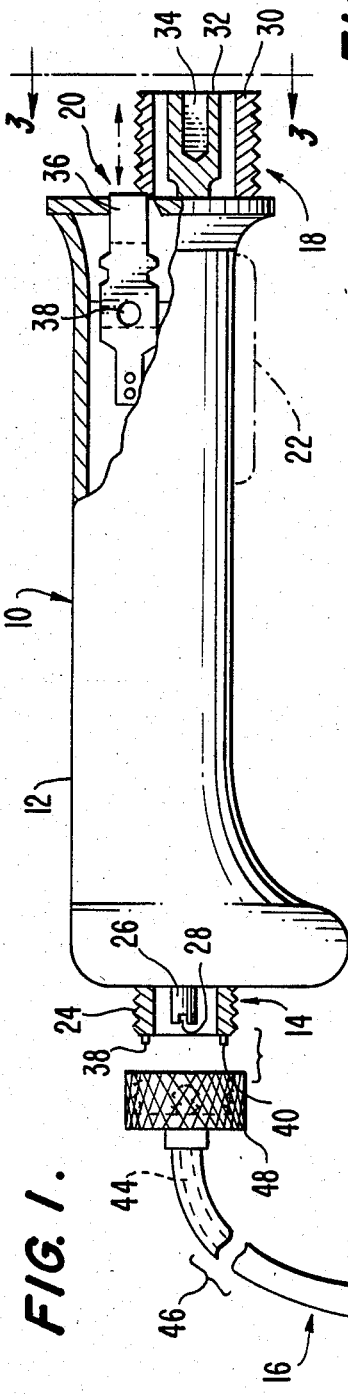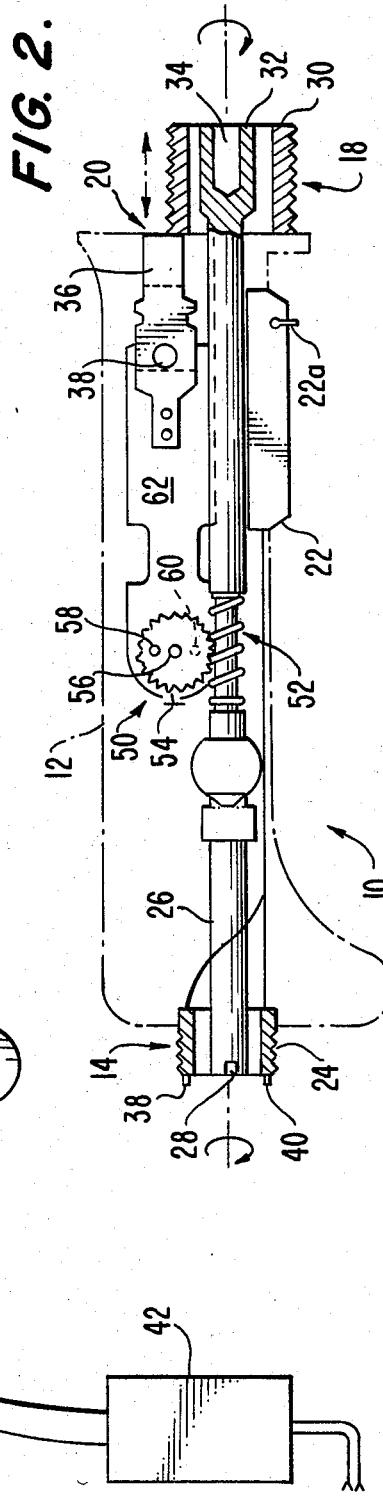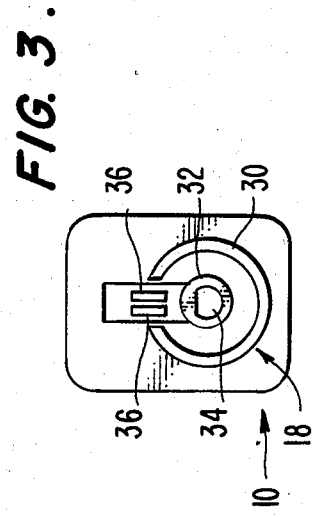

MULTI-PURPOSE POWER TOOL

BACKGROUND OF THE INVENTION

The present invention relates to multi-purpose power tools and more particularly to multi-purpose power tools well suited for use by those persons, such as sportsmen, who process game such as fish, fowl, or animals by cutting, descaling, and/or defeathering.

Wild game such as fish, fowl and animals are commonly dressed in the field by sportsmen using tools particularly designed for portability as well as for the particular type of game to be dressed. The tools conventionally used for dressing game are most commonly in the nature of a knife which may have both a scaling edge for removing fish scales, for example, and a cutting blade for dressing fish and perhaps other types of wild animals. Other types of easily carried hand-tools are known and widely used in the field by sportsmen. While the traditional hand tools are reasonably well suited for their intended function, their use can be time and energy consuming and require a minimum level of skill.

The amount of game that a sportsman can dress with hand-held tools has usually been limited, since many hunting and fishing locations are accessible only by foot and the game that can be dressed is limited to that which can be carried. With the increased use of off-road four-wheel drive vehicles and other types of all-terrain vehicles, sportsman now have the ability to drive directly to hunting and fishing locations that were previously accessible only by foot. The availability of a vehicle at a campsite increases the convenience by which game can be dressed, since a portion of the vehicle, such as the tailgate, can serve as a workplace. In addition, larger quantities of game can be transported, and the dressing tools can be stored in the vehicle.

Various power-driven tools are known for performing the cutting, descaling, and defeathering functions described above. These power tools, however, are typically specialized for a single function only and have traditionally been stationary appliances utilized in commercial business operations. These single-function specialized tools are not suited for vehicle mounting for use in the field.

As can be appreciated from the above, a need exists for a power tool that performs the traditional cutting, descaling, and defeathering functions and is convenient enough to be used by a vehicle-equipped sportsman for dressing game in the field.

SUMMARY OF THE INVENTION

In view of the above, the present invention provides a multi-purpose power tool well suited for use by sportsmen for dressing or otherwise treating fish and/or fowl or similar game that must be processed by cutting, sawing, descaling, or defeathering. In accordance with the present invention, a hand held drive unit is preferably powered through an elongated motor-driven flexible drive shaft and includes a reciprocating output coupling and a rotary output coupling. An edged knife accessory can be selectively connected to the reciprocating output coupling for use as a powered cutting implement and a fish descaling accessory can be connected to the rotary output coupling for use as a powered fish descaler. In addition, a defeathering accessory can be mounted upon the fish descaler to provide a powered defeathering accessory. The flexible drive shaft unit is preferably driven by an electric motor connected to and powered by an automobile-type battery so that the power tool is well suited for use in the field.

A principal objective of the present invention is, therefore, the provision of an improved multi-purpose power tool well suited for the dressing of game, particularly fish or fowl. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a side view, in partial cross-section, of a hand-held power drive unit in accordance with the present invention;

FIG. 2 is a side view, in full cross-section, of the hand-held power drive unit of FIG. 1;

FIG. 3 is an end view, taken along line 3—3 of FIG. 1, of the hand-held power drive unit of FIGS. 1 and 2;

DESCRIPTION OF THE PREFERRED EMBODIMENT

Figure 4:
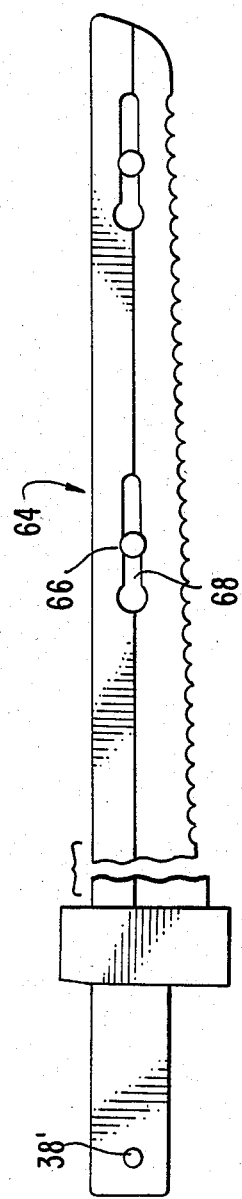
FIG. 4 is a side elevational view of an edged cutting accessory for use with the hand-held power drive unit of FIGS. 1 to 3.

A multi-purpose power tool in accordance with the present invention is illustrated in FIGS. 1 and 2 and generally designated therein by the reference character 10. The power tool 10 includes a handle 12, an input coupling 14 that is connectable to a flexible drive shaft unit 16, a rotary output coupling 18, a reciprocating output coupling 20 located above the rotary output coupling, and an in-handle ON-OFF switch 22. The handle 12 is preferably fabricated as a molded plastic unit, for example, being defined by a two-piece clam shell type construction. If desired, the surface of the handle 12 can be provided with a cross-hatched or other grip-enhancing surface features.

The rotary input coupling 14 is located at the heel end of the handle 12 and includes a cylindrical, externally threaded extension 24 with a rotatably mounted input shaft 26 concentrically aligned within the extension 24. The input shaft 26 has a diametric slot 28 formed at its end for engagement with the flexible drive shaft unit 16, as described more fully below.

The rotary output coupling 18 includes a cylindrical, externally threaded extension 30, with a rotatively mounted output shaft 32 concentrically aligned within the extension 30. The output shaft 32 includes a counter bore 34 for engagement with one of the rotatively driven accessories described below. As shown in FIG. 3, the counter bore 34 includes an internal flat for torque transmitting engagement with a complementary flatted shaft.

The reciprocating output coupling 20 is located above the rotary output coupling 18 and is defined by two side-by-side latches or clips 36 (see FIG. 3) that are connected to a below described rotary-to-reciprocation converting mechanism. Each of the spring clips 36 includes an aperture 38 that engages with complementary pins mounted on the blades of edged cutting accessories described below in relationship to FIGS. 4 and 5. As shown in FIG. 3, the externally threaded extension 30 is longitudinally slotted to provide a guide channel for the reciprocating clips 36.

The switch 22 is preferably a spring biased normally off (NO) switch connected by appropriate wiring to electrical contacts 38 and 40 located at the remote end of the threaded extension 24. A two-position safety type detent 22a is provide on the switch 22 to allow selective locking of the switch in the off position.

The power tool 10 receives its operating power through the flexible drive unit 16 from a motor 42. The flexible drive unit 16 is defined by a flexible drive shaft 44 (shown in dotted line illustration) enclosed within a flexible sheath 46. The end of the flexible drive shaft 16 opposite the electric motor 42 is provided with an internally threaded ferrule 48 which is engagable with the externally threaded extension 24. The flexible drive shaft 44 includes a projecting tang (not shown) that fits within and engages the diametric slot 28 at the end of the input shaft 26. The electric motor 42 is preferably of the type that can be powered by a battery, such as a 12 volt motor-vehicle battery. Electrical contacts and associated wires (not shown) are provided with the flexible drive unit 16 to connect to the contacts 38 and 40 and the switch 22 circuit. Actuation of the switch 22 to its ON position closes the motor power circuit to effect operation.

The organization of the motion transmitting and converting components of the power tool 10 are illustrated in FIG. 2. As shown therein, the input shaft 26 couples to a worm gear set, generally designated by the reference character 50, which, in turn connects to the rotary output shaft 32. While not specifically shown, the shafting is supported by appropriate bearings and can be formed from a single shaft unit or from several connected sub-shafts. The worm gear set 50 includes a worm 52, which is in-line with the input and output shafts 26 and 32 and a mating gear 54 mounted in a bracket (not shown) for rotation about an axis 56 perpendicular to that of its mating worm 52. The opposite sides of the gear 54 are each provided with an outwardly extending pin, 58 (solid line illustration) and 60 (broken line illustration). Pin followers, of which only pin follower 62 is illustrated in FIG. 2, are mounted on opposite sides of the gear 54 in a parallel relationship with one another for relative reciprocating motion. Each follower includes a generally vertically aligned slot (not shown) that receives the pin projecting from the adjacent side of the gear 54. Rotation of the gear 54 causes each of the pins 58 and 60 to cause the pin followers 62 to reciprocate. Since the pins 58 and 60 are mounted 180° relative to one another, the pin followers 62 will reciprocate 180° out of phase. The aforementioned clips 36 are connected, as by rivets, for example, to their respective pin followers 62.

As can be well appreciated by those skilled in the art, rotation of the input shaft 26 caused by the flexible drive unit 16 causes the output shaft 32 to likewise rotate and the pin followers 62 and their connected clips 36 to reciprocate.

The power tool 10 of FIGS. 1-3 can be used with one or more of the accessories illustrated in FIGS. 4 through 9 to preform various cutting, sawing, descaling, and defeathering functions.

Figure 5:
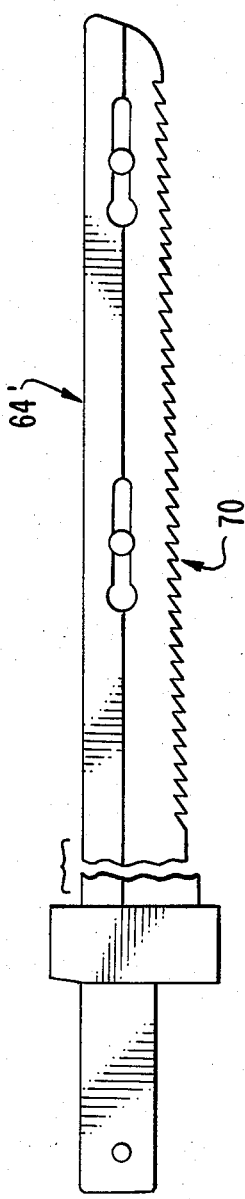
FIG. 5 is a side elevational view of a toothed-cutting accessory also for use with the hand-held power drive unit of FIGS. 1 to 3.

FIG. 4 illustrates a two-blade cutting knife 64 that includes two side-by-side blades coupled for relative sliding reciprocation by headed pins 66 and cooperating lost-motion slots 68. The rearward ends of the blades are each provided with outwardly projecting pins 38' that engage the before-described openings 38 in each of the clips 36. A rotary drive input to the power tool 10 causes the blades of the blade unit 64 to reciprocate relative to one another. The cutting edge of the blade unit 64 is serrated to facilitate the cutting of flesh. Where it is necessary to saw through bones, the blade unit 64' of FIG. 5 may be utilized. As shown therein, the blade unit 64' is of similar construction to that of the blade unit 64 of FIG. 4 but has a series of cutting teeth 70 formed on the edge. The blade unit 64' is well suited for cutting bone and tough tissue as contrasted to that blade unit 64 of FIG. 4 which is well suited for cutting flesh.

Figure 6:
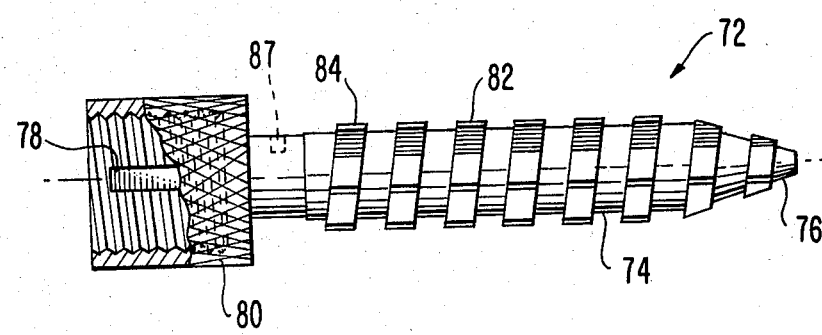
FIG. 6 is a side view of a fish descaling accessory for use with the hand-held power drive unit of FIGS. 1 to 3.
Figure 7:
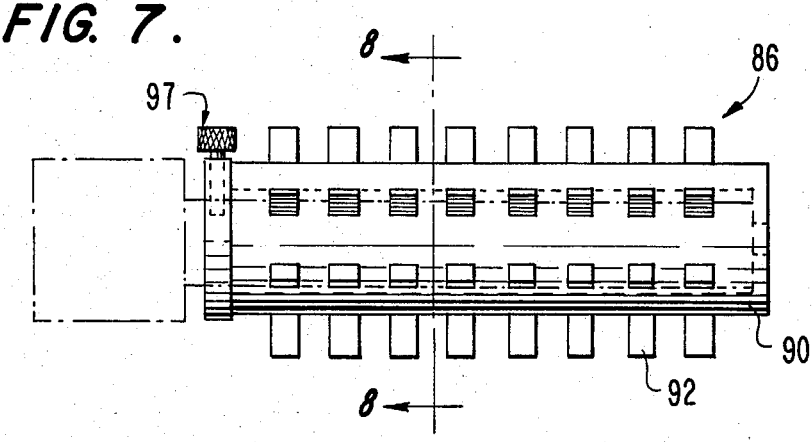
FIG. 7 is a side view of a fowl defeathering accessory for use with the fish descaling accessory of FIG. 6 and the hand-held power drive unit of FIGS. 1 to 3.

FIG. 6 illustrates a fish descaler, designated generally by the reference character 72, that can be coupled to the rotary output coupling 18. The descaler 72 is defined by a generally elongated solid body 74 with a tapered tip 76 at one end and a flatted shaft 78 at the other end. An internally threaded captive ferrule 80 surrounds the flatted shaft 78 for engagement with the externally threaded collar 30 so that the flatted shaft 78 is received in a driving engagement within the counter bore 34 of the output shaft 32 of the power tool 10.

The descaler 72 includes a helically formed flight 82 extending along its length with the flight interrupted periodically to present a series of projecting shoulders 84. The descaler 72 is provided with a radially aligned opening 86 for receiving a lock pin as described more fully below.

Figure 8:
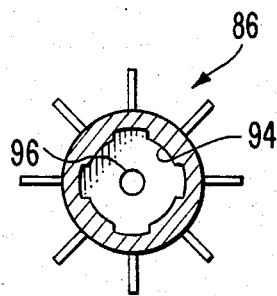
FIG. 8 is a transverse cross-sectional view of the fowl defeathering accessory taken along line 8—8 of FIG. 7.
Figure 9:
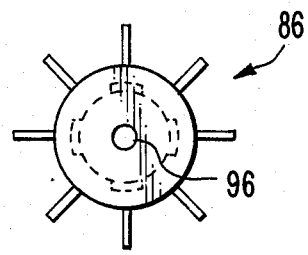
FIG. 9 is an end view of the fowl defeathering accessory of FIG. 7.

In operation, the descaler 72 is coupled to the handle 12 through the rotary output coupling 18. Rotation of the descaler 72 against a scaled fish surface is effective to remove the scales in an efficient manner.

Where it is desired to remove feathers from fowl, the defeathering tool 86 of FIGS. 8 and 10 is utilizied with the descaling tool 72 described above. The defeathering tool 86 is defined by a hollow, generally cylindrical body 90 with rows of radially extending vanes 92. The vanes 92 are resiliant and preferably fabricated from an elastomeric material. The inside diameter surface 94 (FIG. 8) of the defeathering tool 88, as shown in FIG. 8, is sized and configured with appropriate grooving to be placed over the descaler 72 so that the defeathering tool 88 is carried upon and rotated by the fish descaler 72. A lock or detent pin 97 is provided on the defeathering tool 88 to be received within the bore 82 of the descaler 76 to prevent unintential removal of the defeathering tool from the descaler 72. As shown in FIGS. 8 and 9, a longitudinally extending opening is provided at the remote end of the defeathering tool 88 to assist in demounting the defeathering tool 88 from the descaling tool 72 and to permit convenient cleaning of debris or other material from the bore of the defeathering tool.

In order to use the defeathering tool 88, the descaler 72 is first coupled to the rotary output coupling 18 of the handle 12 with the defeathering tool mounted over the descaler 72 and with the lock pin 96 set to prevent removal of the defeathering tool. Application of the rotating defeathering tool 88 to a bird will cause the vanes 92 to frictionally engage the feathers and effect removal.

Thus it will be appreciated from the above that as a result of the present invention, a highly effective multipurpose power tool is provided by which the principal objective, among others, is completely fulfilled. It will be equally apparent and is contemplated that modification and/or changes may be made in the illustrated embodiment without departure from the invention. Accordingly, it is expressly intended that the foregoing discription and accompanying drawings are illustrative of preferred embodiments only, not limiting, and that the true spirit and scope of the present invention will be determined by reference to the appended claims and their legal equivalent.

What is claimed is:

1. A fish and game dressing power tool comprising:
   an elongated handle shaped externally to be grasped and manipulated with one hand, said handle defining a generally cylindrical drive housing having first and second ends;
   a rotary input coupling presented at said first end of said housing for connection to a rotatable power input shaft;
   a rotatable drive shaft extending within said housing to said second end thereof and connected for direct rotation with said rotary input coupling;
   a rotary tool driving coupling connected to said drive shaft and presented at said second end of said housing;
   a pair of reciprocable blade mounting clips also presented at said second end of said housing;
   means within said housing for converting rotation of said drive shaft to out-of-phase reciprocation of said blade mounting clips; and
   means for alternatively mounting reciprocable knife blades and rotatable dressing tools at said second end of said handle defined housing.

2. The fish and game dressing power tool recited in claim 1 wherein said rotary tool driving coupling includes a rotary tool mount projecting from said second end of said housing farther than said blade mounting clips to allow reciprocation of said clips when a rotatable dressing tool is mounted operably at said second end of said handle defined housing.

3. The fish and game dressing power tool recited in claim 2 wherein said rotary tool driving coupling includes a rotatable torque coupling concentrically positioned within said rotatable tool mount, said tool mount comprising a threaded cylindrical extension having a slot for enabling connection of reciprocable knife blades to said clips.

4. A fish and game dressing power tool comprising:
   an elongated handle shaped externally to be grasped and manipulated with one hand, said handle defining a generally cylindrical drive housing having first and second ends;
   a rotary input coupling presented at said first end of said housing for connection to a rotatable power input shaft;
   a rotatable drive shaft extending within said housing to said second end thereof and connected for direct rotation with said rotary input coupling;
   a rotary tool driving coupling connected to said drive shaft and presented at said second end of said housing;
   a fish descaler tool comprising an elongated cylindrical body having at least one longitudinally interrupted flight thereon to define fish scale engaging edges;
   means for mounting said fish descaler tool rotatably at said second end of said housing in torque transmitting relationship with said rotary tool driving coupling; and
   a defeathering tool comprising a hollow elongated body having a plurality of radially projecting elastomer defeathering blades, said defeathering tool having at least one longitudinally extending interior groove to complement the said flight on said fish descaler tool, thereby to enable reception of said defeathering tool removably on said descaler tool in torque transmitting relationship with said descaler tool and said drive coupling.

5. The fish and game dressing power tool of claim 4 wherein said flight and said groove lie on a helix concentric with said descaler tool and said defeathering tool, respectively.

* * * * *